United States Patent
Lopez et al.

(10) Patent No.: US 11,213,026 B2
(45) Date of Patent: Jan. 4, 2022

(54) SOLUTION FOR PRESERVING AND/OR RINSING AN ORGAN TO BE TRANSPLANTED

(71) Applicant: INSTITUT GEORGES LOPEZ, Lissieu (FR)

(72) Inventors: Georges Antoine Lopez, Anse (FR); Alexandre Lopez, Tassin la Demi Lune (FR)

(73) Assignee: INSTITUT GEORGES LOPEZ, Lissieu (FR)

( * ) Notice: Subject to any disclaimer, the term of this patent is extended or adjusted under 35 U.S.C. 154(b) by 54 days.

(21) Appl. No.: 16/668,156

(22) Filed: Oct. 30, 2019

(65) Prior Publication Data

US 2021/0092947 A1    Apr. 1, 2021

(30) Foreign Application Priority Data

Sep. 27, 2019 (FR) ........................ 1910747

(51) Int. Cl.
*A01N 1/02* (2006.01)

(52) U.S. Cl.
CPC ................. *A01N 1/0226* (2013.01)

(58) Field of Classification Search
None
See application file for complete search history.

(56) References Cited

U.S. PATENT DOCUMENTS

| | | | |
|---|---|---|---|
| 6,641,992 B2 | 11/2003 | Lopez et al. | |
| 9,918,462 B2 | 3/2018 | Lopez et al. | |
| 2002/0068265 A1* | 6/2002 | Lopez | A01N 1/02 435/1.1 |
| 2013/0059285 A1* | 3/2013 | Peralta Uroz | A01N 1/0226 435/1.1 |
| 2014/0080111 A1* | 3/2014 | Lopez | A01N 1/0226 435/1.1 |
| 2020/0060260 A1* | 2/2020 | Fontes | A01N 1/0247 |

OTHER PUBLICATIONS

Panisello, A. et al. Polyethylen Glycol 35 Preserved Liver Graft Glycocalix and Cytoskeleton Integrity ... Transplantation 100(5)Suppl 1, pp. S222, #P-268, May 2016. (Year: 2016).*
Zaouali, M. et al. Relevance of Proteolysis and Proteasome Activation in Liver Graft Preservation. World J of Gastroenterology 23(23)4211-4221, Jun. 2017. (Year: 2017).*
Panisello-Rosello A. et al. Cytoprotective Mechanisms in Fatty Liver Preservation Against Cold Ischemia Injury. Int J of Molecular Sciences 19(2)1-13, Jan. 2018. (Year: 2018).*
Ostrozka-Cieslik A. et al. Tips for Optimizing Organ Preservation Solutions. Acta Biochmica Polonica 65(1)9-15, Jan. 2018. (Year: 2018).*
Duranski, M. et al. Cytoprotective Effects of Nitrite During In vivo Ischemia Reperfusion of the Heart and Liver. J of Clinical Investigation 115(5)1232-1240, 2005. (Year: 2005).*
Nydegger U. et al. New Concepts in Organ Preservation Transplant Immunology 9:215-225, 2002. (Year: 2002).*
Puts, C. et al. Polyethylene Glycol Protects Primary Hepatocytes During Supercooling Preservation. Cryobiology 71:125-129, 2015. (Year: 2015).*

* cited by examiner

*Primary Examiner* — Ralph J Gitomer
(74) *Attorney, Agent, or Firm* — Meunier Carlin & Curfman LLC

(57) ABSTRACT

This invention relates to an aqueous solution for preserving and rinsing organs to be transplanted comprising:
 sodium (Na+) ions at a concentration between 30 and 150 mmol·$L^{-1}$;
 potassium ions (K+) at a concentration between 10 and 40 mmol·$L^{-1}$;
 polyethylene glycol with a molecular weight of 35,000 g·mol-1 (PEG 35000) at a concentration between 2 and 5 g·$L^{-1}$.

14 Claims, 3 Drawing Sheets

[Fig. 1]
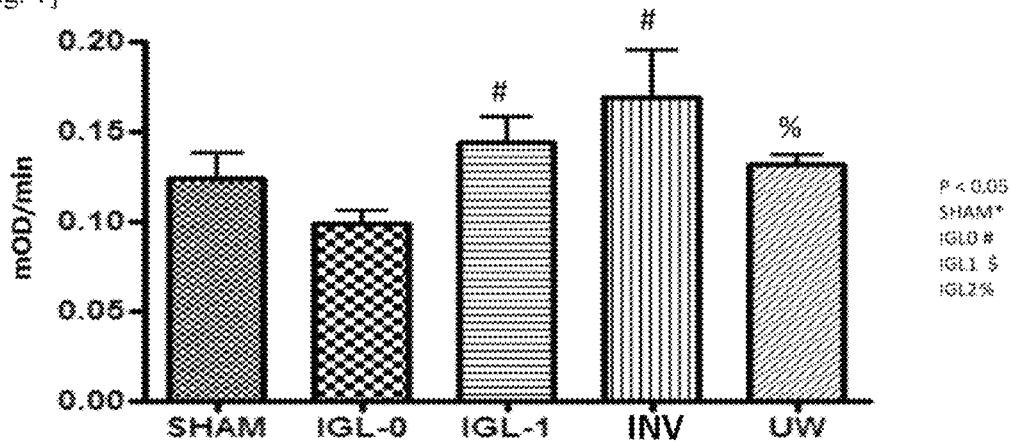
[Fig. 2]
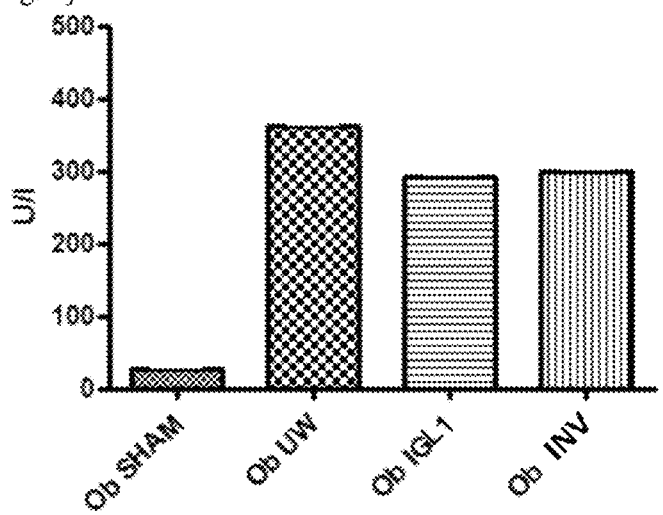
[Fig. 3]
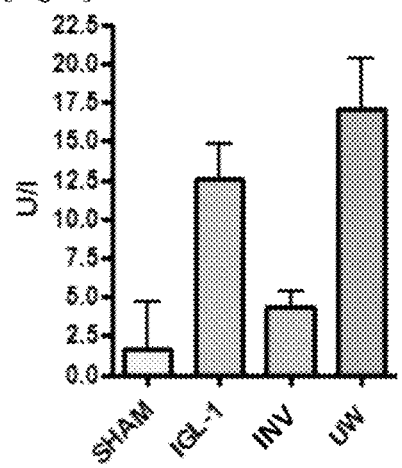

[Fig. 4]
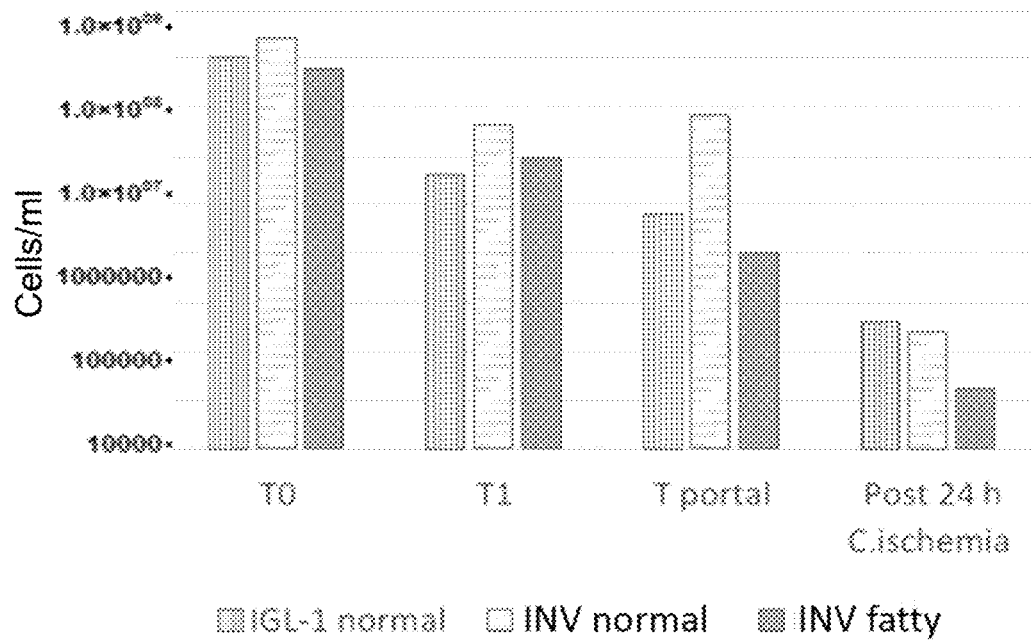
[Fig. 5]

[Fig. 6]
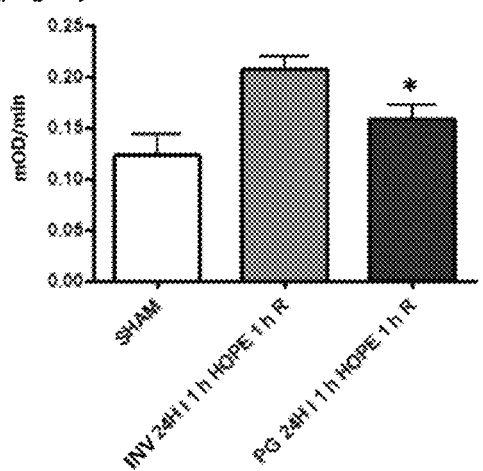
[Fig. 7]
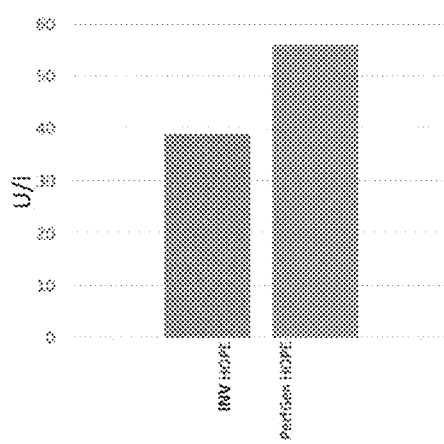
[Fig. 8]
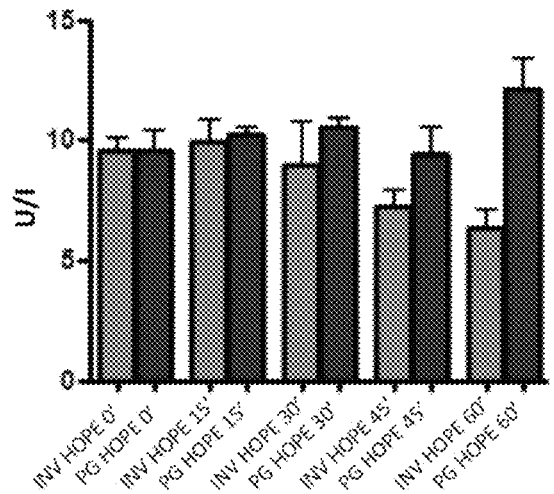

SOLUTION FOR PRESERVING AND/OR RINSING AN ORGAN TO BE TRANSPLANTED

CROSS-REFERENCE TO RELATED APPLICATIONS

This application is a US non-provisional application, which claims the benefit of priority to French Patent Application No. 1910747, filed Sep. 27, 2019, the content of which is incorporated herein by reference in its entirety.

FIELD OF THE INVENTION

This invention relates to an aqueous solution for preserving and/or rinsing an organ to be transplanted and its use for static preservation, dynamic preservation and/or rinsing of an organ to be transplanted.

STATE OF THE PRIOR ART

Organ transplantation is the last resort in the event of failure of a vital organ, which is then replaced by a healthy organ called graft.

Transplanted organs generally come from people with encephalic death (or who are brain dead), whose circulation and breathing are artificially maintained by resuscitation procedures. In France, the law states that all individuals are presumed to be donors, i. e. organ and tissue donors, unless an individual has expressed during his or her lifetime his or her refusal to have an organ removed. A waiver of organ removal may also be decided by the medical team due to the donor's medical history (tumors, infections or other diseases) or medical obstacles. In parallel, many transplants are performed from living donors, for example, kidney transplants.

After being removed from the donor, the organs are subjected to an inevitable period of blood circulation interruption or ischemia (hot and then cold) to ensure their preservation before being assigned to a compatible recipient and then transplanted.

In this context, all organs are exposed to ischemia-reperfusion syndrome lesions. This syndrome is a set of pathophysiological processes responsible for graft lesions, including alteration of cell populations.

Ischemia-reperfusion is one of the main factors leading to organ damage before transplantation, delayed and/or impaired recovery of organ function, increased risk of rejection or reduced long-term graft survival. The result is a significant damage to organs that can no longer be transplanted or the need for a new transplant due to a relatively long-term functional failure of the graft.

Despite steady progress in the field of organ donation, the list of people waiting for an organ transplant is growing, due in particular to the success of the transplantation activity, its benefits for patients and the aging of the population. To date, more than 20,000 people are waiting for an organ transplant. In 5 years, this number has increased by 17% (Agency of Biomedicine).

The lack of organs available for transplantation is currently one of the major public health problems.

This observation leads to the search for other available grafts, or even new therapeutic possibilities. For example, xeno-transplantation (organs taken from animals) and cell therapy are possible but may not be available for several years.

Other more accessible and faster options to implement are to improve/adapt graft preservation to:
  reduce the number of graft losses; and
  be able to use so-called "marginal" grafts, which are generally too sensitive and deteriorate faster than "healthy" grafts, during the transplant procedure.

For example, for liver transplantation, a solution to the shortage of organs would be to use "marginal" grafts such as livers with steatosis.

Hepatic steatosis is a liver pathology associated with an excess of lipids, mainly triglycerides, within the cytoplasm of hepatocytes. The prevalence of this disease is 20% to 30% in developed countries. This is therefore a common disease, whose prevalence tends to increase with the increase in cases of obesity and diabetes.

Two types of hepatic steatosis are observed, micro-vesicular steatosis with varied etiology, which is characterized by the presence of multiple small lipid vacuoles within the cytoplasm and wherein the presence thereof does not lead to displacement of the nucleus of hepatocytes. The second type of steatosis, the most severe, is macrovacuolar steatosis, wherein one of the etiologies is the excessive consumption of alcohol. This type of steatosis is characterized by a single large lipid vacuole that displaces the nucleus of hepatocytes.

Steatotic livers are more sensitive to static preservation in hypothermia. Indeed, in this pathological context, oxygen availability is reduced due to morphological abnormalities of hepatocytes.

The criteria for transplanting or not "marginal" grafts are not clear and each transplant center has its own evaluation parameters for choosing to remove and then assign a graft to a recipient.

Preservative solutions or rinsing solutions are commonly used to wash away residual blood from the graft, cool the organ or preserve it, especially during transportation.

When the organ is removed from the donor's body, it is cut off from any vascularization and subjected to a phenomenon of hot ischemia. The cells rapidly necrotize, which affects the viability of the graft. To limit this phenomenon, the organ is quickly placed in a preservation solution at +4° C. This is static hypothermic preservation, which is the most common method of preservation. The organ can be maintained in this solution until the time of transplantation.

In this context, the role of the preservation liquid is to reduce the impact of ischemia-reperfusion lesions (cellular lesions and alloimmune reaction) but also to ensure irrigation of the graft for almost complete elimination of blood, to homogeneously distribute hypothermia and to limit the harmful effects caused by cold ischemia.

However, this method ensures organ preservation for a limited period of time, for example less than 24 hours for the kidney, 8 to 12 hours for the liver or 4 to 6 hours for the heart.

Among the main solutions used are:
  Solutions for which the potassium ($K^+$) concentration is higher than the sodium ($Na^+$) concentration, called intracellular solutions. For example, we can mention the BELZER UW® (UW®) solution for renal, hepatic and pancreatic preservation, marketed by BRIDGE TO LIFE;
  Solutions for which the potassium ($K^+$) concentration is lower than the sodium ($Na^+$) concentration, called extracellular solutions. For example, SAINT THOMAS® liquid for the preservation of heart grafts, marketed by LES LABORATOIRES AGUETTANT.

Document WO 00/69259 describes an extracellular preservation solution that uses as an oncotic agent a 35,000-

Dalton polyethylene glycol (PEG 35) at a concentration of 0.029 mM or 1 g·L$^{-1}$. This preservation solution is used for static hypothermic preservation and has shown properties in endothelial cell protection as well as antioxidant properties for renal and hepatic preservation before transplantation.

A first possibility for the preservation and transport of graft is to immerse the organ to be transplanted in the preservation solution maintained at between +2 and +8° C. (static hypothermic preservation) as mentioned above. There is no circulation of the solution in the graft.

An alternative is to continuously infuse the graft until it is implanted in the recipient (dynamic preservation) in hypothermic conditions.

The principle of dynamic preservation requires the use of an infusion machine (or IM) and is based on a continuous or pulsatile controlled circulation of an infusion (or solution).

To date, there are two types of IM: continuous flow or pulsatile flow machines. This flow provides a supplement of nutrients with more or less oxygen while the toxic waste and free radicals produced can be eliminated.

For example, the Lifeport® machine, marketed by ORGAN RECOVERY SYSTEM, is a machine used for the hypothermic infusion of renal grafts. One of the solutions used with this machine is the Belzer-MPS® solution, derived from the UW® solution.

The RM3® machine is a pulsatile IM marketed by IGL and which allows the transport of one or two kidneys. It has a regulated pumping system that mimics the systole and diastole phenomena observed in the heart.

The preservation solution used in an infusion machine must be chosen carefully, particularly with regard to its viscosity, to ensure an efficient and continuous infusion of the graft.

To date, it is necessary to clean the organ with a rinsing liquid for example of the type described in the application WO 2012/150392. This document describes an extracellular rinsing solution containing a high proportion of PEG and an amount of K$^+$ less than 10 mmol·L$^{-1}$. The organ is then preserved by choosing another solution that corresponds to a preservation solution adapted to the selected preservation system (static or dynamic). In addition, it appears from the above developed features that the preservation solution must also be chosen based on the organ to be transplanted.

In other words, there is no suitable solution, particularly in terms of formulation and viscosity, that can be used to rinse the graft but also to preserve the graft, whether in a static or dynamic system.

There is, therefore, an evident need to develop a universal solution that can ensure the rinsing of a graft and at the same time its effective preservation through the implementation of static or dynamic preservation methods. In addition, this solution should be able to rinse and/or preserve "marginal" grafts.

BRIEF DESCRIPTION OF THE INVENTION

The Applicant has developed a new generation of solution for the preservation and/or rinsing of organs to be transplanted that solves the problems of the prior art mentioned above.

In particular, the solution according to this invention ensures a better rinsing and/or preservation of the graft, allowing to reduce cellular alterations as well as damage to the organ's function. The solution according to this invention is also effective for rinsing and/or preserving "marginal" grafts. The result is an increase in the number of transplant candidates, a faster and more efficient functional recovery of the graft and an improvement in the quality of the organs to be transplanted.

Contrary to all expectations, the presence of PEG 35 at a concentration greater than 1 g·L$^{-1}$ in a solution with a specific composition of sodium ions (Na$^+$) and (K$^+$) does not alter its initial viscosity and makes it a solution suitable for static preservation as well as for infusion machines (IM).

According to a first aspect, this invention relates to an aqueous solution for preserving and/or rinsing transplanted organs comprising:
- sodium (Na$^+$) ions at a concentration between 30 and 150 mmol·L$^{-1}$;
- potassium ions (K$^+$) at a concentration between 10 and 40 mmol·L$^{-1}$;
- polyethylene glycol with a molecular weight of 35,000 g·mol$^{-1}$ (PEG 35000) at a mass concentration between 2 and 5 g·L$^{-1}$.

Therefore, according to this invention, polyethylene glycol has a molar concentration between 0.057 and 0.143 mmol·L$^{-1}$.

According to this invention, "solution" refers to a homogeneous mixture, consisting of a single phase (solvent), containing at least one substance (solute) dissolved in the solvent.

According to this invention, "preservation" refers to the ex vivo maintenance of the viability of the cells of the organ to be transplanted as well as its physiological functions. According to this invention, the term "conservation" may be used to refer to the same mechanism.

According to this invention, "rinsing" refers to the action of cleaning the organ to be transplanted after its collection to remove residual blood, eliminate degradation products of cellular metabolism or catabolites (e. g. endothelin) released after hot ischemia or eliminate the accumulation of large amounts of potassium likely to cause heart rhythm disorders in the recipient.

According to this invention, the terms "organ to be transplanted" or "graft" refer to the same object, namely, an organ or tissue to be transplanted from a donor to a recipient by surgical intervention in order to replace a failed organ.

According to this invention, "transplantation" refers to the transfer of a whole organ from a donor, involving the restoration of the related and efferent vascular continuity of this organ with the recipient's circulatory system. In a broader sense, the term "graft" can be used.

According to a particular embodiment, the solution is of the extracellular type in that it contains a higher concentration of Na$^+$ than K$^+$.

According to a particular embodiment, the solution according to this invention also includes glutathione, as an antioxidant agent, at a concentration advantageously between 1 and 11 mmol·L$^{-1}$, for example 9 mmol·L$^{-1}$.

Glutathione is an enzyme that engages in the elimination of free radicals (or reactive oxygen species, ROS) to reduce the phenomenon of oxidative stress that causes deterioration of the organ to be transplanted.

According to a particular embodiment, the solution according to this invention also includes zinc ions (Zn$^{2+}$) at a concentration advantageously between 0.170 and 0.210 mmol·L$^{-1}$, for example 0.191 mmol·L$^{-1}$.

Zinc plays several roles in cellular metabolism, including being a cofactor in activating the endothelial form of nitric oxide synthase (or eNOS or NOS3). Zinc therefore indirectly contributes to the increase in nitric oxide concentration in the graft.

Advantageously, $Zn^{2+}$ ions are provided by a zinc salt, for example, zinc gluconate or zinc chloride, preferably zinc chloride.

According to a particular embodiment, the solution according to this invention also includes nitrite ions ($NO^{2-}$) at a concentration advantageously between 5 and 100 nmol·$L^{-1}$, for example 50 nmol·$L^{-1}$.

Nitrite is the soluble form of nitrous monoxide or nitric oxide (NO), which induces vasodilation of the endothelium of blood vessels, causing an increase in blood flow.

Advantageously, $NO^{2-}$ ions are provided by a nitrite salt, for example, sodium nitrite ($NaNO_2$), calcium nitrite ($Ca(NO_2)_2$) or potassium nitrite ($KNO_2$) preferably sodium nitrite ($NaNO_2$).

According to a particular embodiment, the pH of the preservation and/or rinsing solution according to this invention is advantageously between 7.2 and 7.6, for example equal to 7.4.

According to a particular embodiment, the osmolarity of the solution is advantageously between 250 and 380 mosm.$L^{-1}$, for example equal to 290 mosm.$L^{-1}$.

According to a particular embodiment, the solution according to this invention further comprises at least one impermeant anion, at least one sugar, at least one cell membrane stabilizing agent, a buffer solution and/or at least one energy source.

According to a particular embodiment, the solution according to this invention also includes:
- raffinose at a concentration advantageously between 25 and 35 mmol·$L^{-1}$, for example 30 mmol·$L^{-1}$; and allopurinol at a concentration advantageously between 0.5 and 1.5 mmol·$L^{-1}$, for example 1 mmol·$L^{-1}$; or alternatively
- mannitol at a concentration advantageously between 40 and 80 mmol·$L^{-1}$, for example 60 mmol·$L^{-1}$.

According to a particular embodiment, the solution according to this invention also includes:
- raffinose at a concentration advantageously between 25 and 35 mmol·$L^{-1}$, for example 30 mmol·$L^{-1}$; and allopurinol at a concentration advantageously between 0.5 and 1.5 mmol·$L^{-1}$, for example 1 mmol·$L^{-1}$; or alternatively
- mannitol at a concentration advantageously between 40 and 80 mmol·$L^{-1}$, for example 60 mmol·$L^{-1}$, and histidine at a concentration advantageously between 25 and 35 mmol·$L^{-1}$, for example 30 mmol·$L^{-1}$.

In a particular embodiment, the solution according to this invention also includes:
- lactobionic acid at a concentration advantageously between 80 and 120 mmol·$L^{-1}$, for example 100 mmol·$L^{-1}$;
- sulphate ions ($SO_4^{2-}$), preferably provided by magnesium sulphate ($MgSO_4$), at a concentration advantageously between 4 and 6 mmol·$L^{-1}$, for example 5 mmol·$L^{-1}$;
- phosphate ions ($PO_4^{3-}$), preferably provided by potassium phosphate ($KH_2PO_4$), at a concentration advantageously between 20 and 30 mmol·$L^{-1}$, for example 25 mmol·$L^{-1}$; and
- adenosine at a concentration advantageously between 4 and 6 mmol·$L^{-1}$, for example 5 mmol·$L^{-1}$.

In a preferred embodiment, the composition of the solution according to this invention includes:
- PEG 35000 at a concentration of 5 g·$L^{-1}$;
- glutathione at a concentration of 9 mmol·$L^{-1}$;
- $Zn^{2+}$ ions at a concentration of 0.191 mmol·$L^{-1}$;
- $NO^{2-}$ ions at a concentration of 50 nmol·$L^{-1}$;
- raffinose at a concentration of 30 mmol·$L^{-1}$;
- lactobionic acid at a concentration of 100 mmol·$L^{-1}$;
- $SO_4^{2-}$ ions, preferably provided by $MgSO_4$, at a concentration of 5 mmol·$L^{-1}$;
- $PO_4^{3-}$ ions, preferably provided by $KH_2PO_4$, at a concentration of 25 mmol·$L^{-1}$;
- adenosine at a concentration of 5 mmol·$L^{-1}$;
- allopurinol at a concentration of 1 mmol·$L^{-1}$.

In another preferred embodiment, the composition of the solution according to this invention includes:
- PEG 35000 at a concentration of 5 g·$L^{-1}$;
- glutathione at a concentration of 9 mmol·$L^{-1}$;
- $Zn^{2+}$ ions at a concentration of 0.191 mmol·$L^{-1}$;
- $NO^{2-}$ ions at a concentration of 50 nmol·$L^{-1}$;
- mannitol at a concentration of 60 mmol·$L^{-1}$;
- lactobionic acid at a concentration of 100 mmol·$L^{-1}$;
- $SO_4^{2+}$ ions, preferably provided by $MgSO_4$, at a concentration of 5 mmol·$L^{-1}$;
- $PO_4^{3-}$ ions, preferably provided by $KH_2PO_4$, at a concentration of 25 mmol·$L^{-1}$;
- adenosine at a concentration of 5 mmol·$L^{-1}$.

In another preferred embodiment, the composition of the solution according to this invention includes:
- PEG 35000 at a concentration of 5 g·$L^{-1}$;
- glutathione at a concentration of 9 mmol·$L^{-1}$;
- $Zn^{2+}$ ions at a concentration of 0.191 mmol·$L^{-1}$;
- $NO^{2-}$ ions at a concentration of 50 nmol·$L^{-1}$;
- mannitol at a concentration of 60 mmol·$L^{-1}$;
- histidine at a concentration of 30 mmol·$L^{-1}$;
- lactobionic acid at a concentration of 100 mmol·$L^{-1}$;
- $SO_4^{2+}$ ions, preferably provided by $MgSO_4$, at a concentration of 5 mmol·$L^{-1}$;
- $PO_4^{3-}$ ions, preferably provided by $KH_2PO_4$, at a concentration of 25 mmol·$L^{-1}$;
- adenosine at a concentration of 5 mmol·$L^{-1}$.

In another aspect, this invention relates to the use of the solution according to this invention for the advantageously hypothermic static preservation of an organ to be transplanted.

According to the invention, the solution is used at a temperature advantageously between +1 and +12° C., preferably between +2 and +8° C., for example +5° C., for the static preservation of an organ to be transplanted.

In another aspect, this invention relates to the use of the solution according to this invention for the advantageously hypothermic dynamic preservation of an organ to be transplanted.

According to the invention, the solution is used at a temperature advantageously between +1 and +12° C., preferably between +2 and +8° C., for example +5° C., for the dynamic preservation of an organ to be transplanted.

According to a particular embodiment, the solution according to this invention is used for the infusion of a graft into a continuous flow machine.

According to a particular embodiment, the solution according to this invention is used for the infusion of a graft in a pulsatile flow machine.

In another aspect, this invention relates to the use of the solution according to this invention for rinsing an organ to be transplanted.

According to the invention, the solution is used at a temperature advantageously between +1 and +12° C., preferably between +2 and +8° C., for example +5° C., to rinse an organ to be transplanted.

According to a particular embodiment, the solution according to this invention is used to rinse the organ to be transplanted and to ensure its preservation, static or dynamic, before transplantation to a recipient.

According to a particular embodiment, the organ to be transplanted is a healthy or "marginal" organ.

According to a particular embodiment, the organ to be transplanted is an abdominal organ, preferably the liver, pancreas, kidney or intestines.

According to a particular embodiment, the liver to be transplanted is a healthy liver or a steatotic liver.

According to another embodiment, the organ to be transplanted is a tissue.

For example, a tissue according to this invention is the cornea, bone, skin, blood vessels, tendons or heart valves.

The invention and the advantages deriving therefrom will be better understood from the following figures and examples provided as a non-limiting illustration of the invention.

FIG. 1 represents the quantification of aldehyde dehydrogenase-2 (ALDH 2) activity after 24 hours of static hypothermic preservation of a liver in a UW®, IGL-0, IGL-1 solution or solution according to this invention (INV).

FIG. 2 represents the quantification of transaminase content in liver tissue after 24 hours of static hypothermic preservation of a liver in UW®, IGL-1 solution or solution according to this invention (INV).

FIG. 3 represents the quantification of the glutamate dehydrogenase (GLDH) content in liver tissue after 24 hours of static hypothermic preservation of a liver in UW®, IGL-1 solution or solution according to this invention (INV).

FIG. 4 represents the determination of the amount of cells present in the rinse effluent of a healthy liver or a steatotic liver, rinsed with IGL-1® solution or solution according to this invention (INV).

FIG. 5 represents the quantification of the number of red blood cells remaining in the liver tissue after rinsing a healthy liver or a steatotic liver with UW®, IGL-1® solution or solution according to this invention (INV).

FIG. 6 represents the evaluation of aldehyde dehydrogenase-2 (ALDH 2) activity in the liver after dynamic hypothermic preservation with PERF-GEN® solution or solution according to this invention (INV).

FIG. 7 represents the evaluation of hepatic parenchyma degradation by measuring the aspartate aminotransferase (ASAT) content in the liver after dynamic hypothermic preservation with PERF-GEN® solution or solution according to this invention (INV).

FIG. 8 represents the evaluation of hepatic parenchyma degradation by measuring the glutamate dehydrogenase (GLDH) content in the liver after dynamic hypothermic preservation with PERF-GEN® solution or solution according to this invention (INV).

EXAMPLE EMBODIMENT OF THE INVENTION

1/Preparation of the Preservation and Rinsing Solution According to this Invention A solution according to this invention is prepared by mixing the ingredients according to the formulation (per 1 liter) in Table 1:

TABLE 1

| Ingredient | Concentration |
| --- | --- |
| PEG 35000 (molecular weight 35,000 g · L$^{-1}$) | 0.14 mM (5 g · L$^{-1}$) |
| Na$^+$ (provided by NaOH) | 125 mM |
| K$^+$ (provided by KH$_2$PO$_4$) | 25 mM |
| Zn$^{2+}$ (provided by ZnCl$_2$) | 0.191 mM |
| Glutathion | 9 mM |
| NO$^{2-}$ (provided by NaNO$_2$) | 50 nM |
| Raffinose | 30 mM |
| Lactobionic acid | 100 mM |
| SO$_4^{2-}$ (provided by MgSO$_4$) | 5 mM |
| PO$_4^{3-}$ (provided by KH$_2$PO$_4$) | 25 mM |
| Adenosine | 5 mM |
| Allopurinol | 1 mM |

The preparation of the solution consists in dissolving all the ingredients, under magnetic agitation, in an aqueous solution, and the pH of the obtained solution is adjusted to 7.4.

2/Comparison of the Viscosity of the Solutions of the Prior Art Compared to the Solution According to this Invention The viscosity was determined by the European Pharmacopoeia method in Chapter 2.2.9 "Viscosity—Capillary tube method".

TABLE 2

| Solution 1 | IGL-1 ® | INV | Perf-Gen ® |
| --- | --- | --- | --- |
| Use | Static preservation | Rinsing + Static preservation + dynamic preservation | Dynamic preservation |
| Oncotic agent | PEG 35 (1 g · L$^{-1}$) | PEG 35 (5 g · L$^{-1}$) | HES (50 g · L$^{-1}$) |
| Viscosity (cP) | 1.2 | 1.4 | 2.4 |

These results show that, unexpectedly, the significant increase in the PEG concentration in the INV solution compared to the IGL-1® solution does not induce an increase in the viscosity of the solution.

The viscosity of the solution according to this invention is therefore adapted to its use for static (such as IGL-1®) and dynamic (such as Perf-Gen®) preservation.

3/Static Preservation of a Liver under Hypothermia Condition

To assess the effectiveness of the preservation solution according to this invention, evaluations were carried out on healthy livers or livers suffering from steatosis.

3.1/Experimental Conditions The liver of normal (healthy) and obese rats (Zucker rats; steatotic liver and referred to as "Ob" or "fatty" in the figures) aged 10 to 12 weeks was collected and stored according to techniques known to the skilled person.

The purpose of these experiments is to compare the performance of the solution according to this invention (INV Solution) on the preservation of the liver in hypothermia ex vivo compared to an IGL-0 solution (IGL-1® solution formulated without PEG) or to prior art solutions, namely:

Belzer UW® solution (hereinafter referred to as UW);
IGL-1® solution.

The organ is then stored statically in the rinsing solution (100 mL; HTK®, IGL-1 ® or INV) for 24 hours at 4° C.

Different parameters were measured to evaluate the effectiveness of the solution according to this invention on liver preservation in hypothermia conditions.

3.2/Quantification of Aldehyde Dehydrogenase-2 Content in Liver Tissue

Mitochondrial aldehyde dehydrogenase 2 (ALDH 2) is a major enzyme in aldehyde metabolism that protects against toxic accumulation of aldehyde at the cellular level, for example, by converting acetaldehyde to acetic acid. The activation of aldehyde dehydrogenase-2 (ALDH2) is associated with protection of the cells of the organ to be transplanted.

After 24 hours of preservation in UW®, IGL-0 (IGL-1 ® solution formulated without PEG), IGL-1® or INV solutions, an analysis of ALDH2 activation by enzyme kit was performed on healthy livers.

The results are shown in FIG. 1.

The data show that preserving the liver in an INV solution induces an increase in ALDH2 activity in tissue compared to IGL-0, IGL-1 ® and UW® solutions. The result is protection of the organ against damage caused by ischemia.

The formulation of IGL-0 and UW solutions is PEG-free. These results therefore show that the PEG 35 used at a concentration according to this invention in the INV solution provides better organ protection (value of $p<0.05$).

3.3/Quantification of Transaminase Content in Liver Tissue

Transaminases (alanine aminotransferase, aspartate aminotransferase . . . ) are enzymes synthesized by hepatocytes and released in case of hepatocellular lesion or necrosis. The transaminase concentration is therefore a marker of the effectiveness of liver preservation with a preservation solution.

After 24 hours of preservation in UW®, IGL-1® or INV solutions, a quantitative analysis of transaminase levels by enzyme kit was performed on steatotic livers.

The results are shown in FIG. 2.

The data show that the transaminase concentration is lower after 24 hours of preservation with the INV solution according to this invention than with the UW® solution. In other words, the INV solution provides better preservation than the UW® solution.

3.4/Quantification of Glutamate Dehydrogenase Content in Liver Tissue

Glutamate dehydrogenase (GLDH) is a liver-specific mitochondrial enzyme that plays an important role in amino acid catabolism. It participates in the deamination of glutamic acid (or glutamate) to α-ketoglutarate acid. An increase in serum GLDH concentration indicates a degradation of the hepatic parenchyma and more specifically a degradation of the mitochondria.

After 24 hours of preservation in UW®, IGL-1® or INV solutions, a quantitative analysis of GLDH levels by enzyme kit was performed on steatotic livers.

The results are shown in FIG. 3.

The data show that the GLDH concentration is 2.5 times lower after 24 hours of preservation with the INV solution compared to the IGL-1® solution and 5 times lower than with the UW® solution. These results indicate that the INV solution provides better preservation of the liver to be transplanted than solutions of the prior art.

4/Rinsing a Liver to be Transplanted
4.1/Experimental Conditions

The liver of normal (healthy) and obese rats (Zucker rats; steatotic liver and referred to as "Ob" or "fatty" in the figures) aged 10 to 12 weeks was collected then washed using techniques known to the skilled person.

The purpose of these experiments is to compare the rinsing performance of the solution according to this invention (INV Solution) against the solutions of the prior art, namely:
Belzer UW® solution (hereinafter referred to as UW);
HTK® Preservative Solution (for histidine-tryptophan-ketoglutarate or Custodiol® HTK solution);
IGL-1 ® solution.

The liver is rinsed by influx of the rinsing solution through the aorta and efflux through the portal vein.

Different parameters were measured to evaluate the effectiveness of the solution according to this invention on hepatic rinsing.

4.2/Determination of the Amount of Cells Present in the Liver Tissue Rinse Effluent The rinsing performance of the solution according to this invention (INV) is evaluated at:
T0 (aortic dissection after the total flushing volume has passed through the aorta in all experimental groups except HTK);
T1 (after the total rinse volume has passed through the aorta in the HTK group);
T2 (after the total rinse volume has passed through the portal vein); and
T24 (24 hours post-ischemia), on healthy and steatotic livers, compared to IGL-1® solution.

The results are shown in FIG. 4.

The data show that, for the healthy liver, the effluent obtained after rinsing the liver with INV solution is more concentrated in cells, in this case in red blood cells, than IGL-1® solution at T0, T1 and T2. The INV effluent is therefore "dirtier", more concentrated in red blood cells, than IGL-1 effluent throughout the liver harvesting procedure. The INV solution according to this invention therefore ensures a better liver flushing than the IGL-1® solution.

As known to the skilled person, the rinsing of a steatotic liver is less effective than that of a healthy liver due to cellular and tissue damage. The results show that the INV solution induces a decrease in cell concentration in the effluent over time. These data therefore reflect that the solution according to this invention ensures an effective rinsing of the steatotic liver.

4.3/Quantification of the Number of Red Blood Cells Present in the Liver Tissue after Rinsing A histological analysis was conducted to quantify the number of red blood cells remaining in:
healthy liver tissue, after harvesting and rinsing with HTK®, IGL-1 and INV solutions; and
steatotic ("fatty") liver tissue, after harvesting and rinsing with UW and INV solutions.

The results are shown in FIG. 5.

For a healthy liver, the data show that the liver rinsed with INV solution contains 7 times less red blood cells than the liver rinsed with the HTK® solution and 2 times less than the liver rinsed with the IGL-1® solution.

For a steatotic liver, the data show that the liver rinsed with INV solution contains more than 1.5 times less red blood cells than the liver rinsed with the UW® solution.

These results confirm that the solution according to this invention provides a better hepatic flushing than the solutions of the prior art.

5/Dynamic Infusion of a Liver
5.1/Dynamic Infusion in Hypothermic Liver Condition A hypothermic infusion machine is used to preserve a liver to be transplanted, this device allows to implement the HOPE (Hypothermic Oxygenated Perfusion) protocol which ensures passive oxygenation of the hypothermic infusion, i.e. without oxygen transporter, which protects mitochondrial integrity, and allows to reduce ischemia-reperfusion lesions in the liver.

The liver to be transplanted is stored in a preservation solution for 7 hours, then placed in a hypothermic infusion machine for 1 hour to be subjected to the HOPE protocol. The liver is then reperfused with a Krebs solution in normothermia.

The Perf-Gen® solution is one of the prior art solutions used in a hypothermic infusion machine. This solution includes hydroxyethyl starch as oncotic agent and glucose as osmotic agent.

The purpose of these experiments is to compare the performance of the solution according to the invention (INV Solution) against the Perf-Gen® solution.

Different parameters were measured to evaluate the efficacy of the solution according to this invention on liver preservation under dynamic infusion conditions in hypothermia:

5.2/Assessment of ALDH2 Content in Liver Tissue

The ALDH2 concentration was measured in healthy liver tissue to assess the protective properties to the cells of the organ to be transplanted of the INV solution used in an infusion device according to the HOPE protocol (see point 3.4), compared to the Perf-Gen® solution.

The results are shown in FIG. 6.

The data show that the INV solution according to this invention induces a significantly higher ALDH2 activity compared to the Perf-Gen® solution after a dynamic infusion in hypothermia.

5.3/Assessment of Hepatic Parenchyma Degradation
5.3.1/Aspartate Aminotransferase The content in aspartate aminotransferase (ASAT), a particular type of transaminase, was measured by enzyme kit 1 hour after being placed under HOPE protocol (see point 3.4).

The results are shown in FIG. 7.

The data show a lower ASAT content in hepatic tissue infused with the solution according to this invention compared to the use of the prior art solution.

5.3.2/GLDH The GLDH content was measured by enzyme kit, at the launch of the HOPE protocol and then every 15 minutes, at 0, 15, 30, 45 and 60 minutes.

The results are shown in FIG. 8.

The data show that infusion with the INV solution ensures a decrease in GLDH content compared to the Perf-Gen® solution.

In conclusion, infusion with the solution according to this invention of a liver in a hypothermic infusion machine leads to lower levels of ASAT and GLDH, reflecting a decrease in the degradation of liver tissue compared to the Perf-Gen® solution.

6/Conclusion

The solution according to this invention is suitable for use for static preservation in hypothermia of an organ to be transplanted and/or for dynamic rinsing of the organ in a hypothermic infusion device. In addition, in these 2 contexts of use, the INV solution according to this invention is more effective than the solutions of the prior art. INV allows protecting the organ to be transplanted and reducing damage to liver tissue caused by ischemia and reperfusion

The invention claimed is:

1. An aqueous solution comprising:
sodium ($Na^+$) ions at a concentration between 30 and 150 $mmol \cdot L^{-1}$;
potassium ions ($K^+$) at a concentration between 10 and 40 $mmol \cdot L^{-1}$;
polyethylene glycol with a molecular weight of 35,000 $g \cdot mol^{-1}$ (PEG 35000) at a concentration between 2 and 5 $g \cdot L^{-1}$;
raffinose at a concentration between 25 and 35 $mmol \cdot L^{-1}$ and allopurinol at a concentration between 0.5 and 1.5 $mmol \cdot L^{-1}$, or
mannitol at a concentration between 40 and 80 $mmol \cdot L^{-1}$, or
mannitol at a concentration between 40 and 80 $mmol \cdot L^{-1}$ and histidine at a concentration between 25 and 35 $mmol \cdot L^{-1}$, and
wherein the aqueous solution is an organ preservation and rinsing solution.

2. The solution of claim 1, further comprising glutathione, as an antioxidant agent, at a concentration between 1 and 11 $mmol \cdot L^{-1}$.

3. The solution of claim 1, further comprising zinc ions ($Zn^{2+}$) at a concentration between 0.170 and 0.210 $mmol \cdot L^{-1}$.

4. The solution of claim 1 further comprising nitrite ions ($NO^{2-}$) at a concentration between 5 and 100 $nmol \cdot L^{-1}$.

5. The solution of claim 1, wherein the solution has a pH between 7.2 and 7.6.

6. The solution of claim 1 further comprising an impermeant anion, a sugar, a cell membrane stabilizer, a buffer solution, and/or an energy source.

7. The solution of claim 1 further comprising:
lactobionic acid at a concentration between 80 and 120 $mmol \cdot L^{-1}$;
sulphate ions ($SO_4^{2-}$) at a concentration between 4 and 6 $mmol \cdot L^{-1}$;
phosphate ions ($PO_4^{3-}$) at a concentration between 20 and 30 $mmol \cdot L^{-1}$; and
adenosine at a concentration between 4 and 6 $mmol \cdot L^{-1}$.

8. The solution of claim 1 further comprising:
PEG 35000 at a concentration of 5 $g \cdot L^{-1}$;
glutathione at a concentration of 9 $mmol \cdot L^{-1}$;
$Zn^{2+}$ ions at a concentration of 0.191 $mmol \cdot L^{-1}$;
$NO^{2-}$ ions at a concentration of 50 $nmol \cdot L^{-1}$;
raffinose at a concentration of 30 $mmol \cdot L^{-1}$;
lactobionic acid at a concentration of 100 $mmol \cdot L^{-1}$;
$SO_4^{2-}$ ions at a concentration of 5 $mmol \cdot L^{-1}$;
$PO_4^{3-}$ ions at a concentration of 25 $mmol \cdot L^{-1}$;
adenosine at a concentration of 5 $mmol \cdot L^{-1}$; and
allopurinol at a concentration of 1 $mmol \cdot L^{-1}$.

9. The solution of claim 1 further comprising:
PEG 35000 at a concentration of 5 $g \cdot L^{-1}$;
glutathione at a concentration of 9 $mmol \cdot L^{-1}$;
$Zn^{2+}$ ions at a concentration of 0.191 $mmol \cdot L^{-1}$;
$NO^{2-}$ ions at a concentration of 50 $nmol \cdot L^{-1}$;
mannitol at a concentration of 60 $mmol \cdot L^{-1}$;
lactobionic acid at a concentration of 100 $mmol \cdot L^{-1}$;
$SO_4^{2-}$ ions at a concentration of 5 $mmol \cdot L^{-1}$;
$PO_4^{3-}$ ions at a concentration of 25 $mmol \cdot L^{-1}$; and
adenosine at a concentration of 5 $mmol \cdot L^{-1}$.

10. The solution of claim 1 further comprising:
PEG 35000 at a concentration of 5 $g \cdot L^{-1}$;
glutathione at a concentration of 9 $mmol \cdot L^{-1}$;
$Zn^{2+}$ ions at a concentration of 0.191 $mmol \cdot L^{-1}$;
$NO^{2-}$ ions at a concentration of 50 $nmol \cdot L^{-1}$;
mannitol at a concentration of 60 $mmol \cdot L^{-1}$;

histidine at a concentration of 30 mmol·L$^{-1}$;
lactobionic acid at a concentration of 100 mmol·L$^{-1}$;
$SO_4^{2-}$ ions at a concentration of 5 mmol·L$^{-1}$;
$PO_4^{3-}$ ions at a concentration of 25 mmol·L$^{-1}$; and
adenosine at a concentration of 5 mmol·L$^{-1}$.

11. The solution of claim 7, wherein the $SO_4^{2-}$ ions provided by $MgSO_4$ and the $PO_4^{3-}$ ions provided by $KH_2PO_4$.

12. The solution of claim 8, wherein the $SO_4^{2-}$ ions provided by $MgSO_4$ and the $PO_4^{3-}$ ions provided by $KH_2PO_4$.

13. The solution of claim 9, wherein the $SO_4^{2-}$ ions provided by $MgSO_4$ and the $PO_4^{3-}$ ions provided by $KH_2PO_4$.

14. The solution of claim 10, wherein the $SO_4^{2-}$ ions provided by $MgSO_4$ and the $PO_4^{3-}$ ions provided by $KH_2PO_4$.

* * * * *